United States Patent [19]

Johanson et al.

[11] 4,253,093

[45] Feb. 24, 1981

[54] SCRAM SIGNAL GENERATOR

[75] Inventors: Edward W. Johanson, New Lenox; Richard Simms, Westmont, both of Ill.

[73] Assignee: The United States of America as represented by the United States Department of Energy, Washington, D.C.

[21] Appl. No.: 39,426

[22] Filed: May 15, 1979

[51] Int. Cl.³ .................... G08B 21/00; G01P 13/00; G21C 17/02
[52] U.S. Cl. ..................... 340/606; 73/861.08; 176/20 R; 176/22; 328/148; 340/527; 340/609
[58] Field of Search ............... 340/606, 608, 609, 527, 340/661; 176/20 R, 22, 24; 361/178; 307/116, 118; 73/194 R, 194 E, 196; 364/510; 328/147, 148

[56] References Cited

U.S. PATENT DOCUMENTS 3,594,557  7/1971  Anderson ................. 364/510 X
3,602,826  8/1971  List et al. ................. 328/147 X Primary Examiner—John W. Caldwell, Sr.
Assistant Examiner—Daniel Myer
Attorney, Agent, or Firm—James E. Denny; Frank H. Jackson; Donald P. Reynolds

[57] ABSTRACT

A scram signal generating circuit for nuclear reactor installations monitors a flow signal representing the flow rate of the liquid sodium coolant which is circulated through the reactor, and initiates reactor shutdown for a rapid variation in the flow signal, indicative of fuel motion. The scram signal generating circuit includes a long-term drift compensation circuit which processes the flow signal and generates an output signal representing the flow rate of the coolant. The output signal remains substantially unchanged for small variations in the flow signal, attributable to long term drift in the flow rate, but a rapid change in the flow signal, indicative of a fast flow variation, causes a corresponding change in the output signal. A comparator circuit compares the output signal with a reference signal, representing a given percentage of the steady state flow rate of the coolant, and generates a scram signal to initiate reactor shutdown when the output signal equals the reference signal.

15 Claims, 4 Drawing Figures

SCRAM SIGNAL GENERATOR

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to alarm indicators, and more particularly to an alarm signal generating circuit for providing an alarm output indicating a rapid decrease, or increase, in the rate of flow of a fluid.

In nuclear reactor installations, there is a need for rapidly and accurately detecting the onset of nuclear fuel motion, indicative of a breach in the reactor, so that the reactor may be shut down. Since nuclear fuel motion causes variation in the flow rate of the liquid coolant which is circulated through the reactor to cool and protect the reactor, when a liquid sodium coolant is used, the onset of fuel motion in the reactor may be detected by monitoring the flow rate of the coolant using a flowmeter. The amplitude and polarity of the flow signal generated by the flowmeter indicates the rate and direction of flow of the coolant. A rapid change in the flow rate is indicative of the onset of fuel motion.

However, the flow signal is a low level electronic signal, typically less than 10 millivolts, and is subject to long-term drift in real time. Also, the flow signal includes a 60 Hz component due to the large stray 60 Hz currents flowing in the annular linear induction pump which circulates the coolant. Known level alarm circuits are not capable of selecting rapid rates of decline, or rise, from a low-level electronic signal having appreciable noise, including 60 Hz pickup and long-term drift in real time, and providing an indication of the event in a relatively short time.

SUMMARY OF THE INVENTION

The present invention provides an alarm signal generating circuit for nuclear reactor installations for monitoring fuel-motion induced signals provided by an electromagnetic flowmeter and initiating reactor shutdown for rapid variations in the signal output of the flowmeter. The alarm, or scram, signal generating circuit inherently detects fuel motion by monitoring the flowmeter output which produces a flow signal when fuel motion induced changes occur in the flow of liquid sodium coolant which is circulated through the reactor. The circuit allows fast-flow variations caused by fuel motion, as well as interruption of coolant flow caused, for example, by failure or inadvertant shutoff of the coolant pump, to initiate shutdown of the reactor, but prevents slow drift variations, and/or noise, from initiating a shutdown. Also, the fast-flow variations must exceed a given percentage of the steady flow rate before the alarm circuit initiates reactor shutdown. The alarm circuit is adjustable to respond to different percentages of the steady state flow rate.

The alarm signal generating circuit comprises a long-term drift compensation circuit which processes the flow signal and generates an output signal representing the flow rate of the coolant. For small variations in the amplitude of the flow signal, attributable to long term drift in the flow rate, the amplitude of the output signal remains substantially unchanged. However, a rapid change in the amplitude of the flow signal, indicative of a fast flow variation, causes a corresponding change in the amplitude of the output signal. A comparator circuit compares this output signal with a reference signal, which establishes the turnon threshold for the alarm circuit, and generates an alarm output to initiate shutdown of the reactor whenever the amplitude of the output signal reaches the threshold level. The reference signal is proportional to the steady state flow rate of the coolant and adjustable to represent a preselected percentage of the steady state flow rate. The alarm signal generating circuit is adaptive in that the amplitude of the reference signal varies in correspondence with long-term drift in the coolant flow rate.

In accordance with a feature of the invention, filter circuits interposed between the output of the flow meter and the input of the long term drift compensation circuit attenuate high frequency noise and the 60 Hz noise component of the flow signal due to the sodium pump, providing noise immunity for the circuit to prevent inadvertant reactor shutdown while permitting detection of rapid variations in the flow signal due to flow induced changes.

Thus, the alarm signal generating circuit provided by the invention selects rapid rates of decline (or rise) from a low-level electronic signal having appreciable noise, 60 Hz pickup and long term drift in real time, and provides an alarm output indicating the change in the signal in a relatively short time such as within two to five milliseconds.

DESCRIPTION OF A PREFERRED EMBODIMENT

Figure 1:
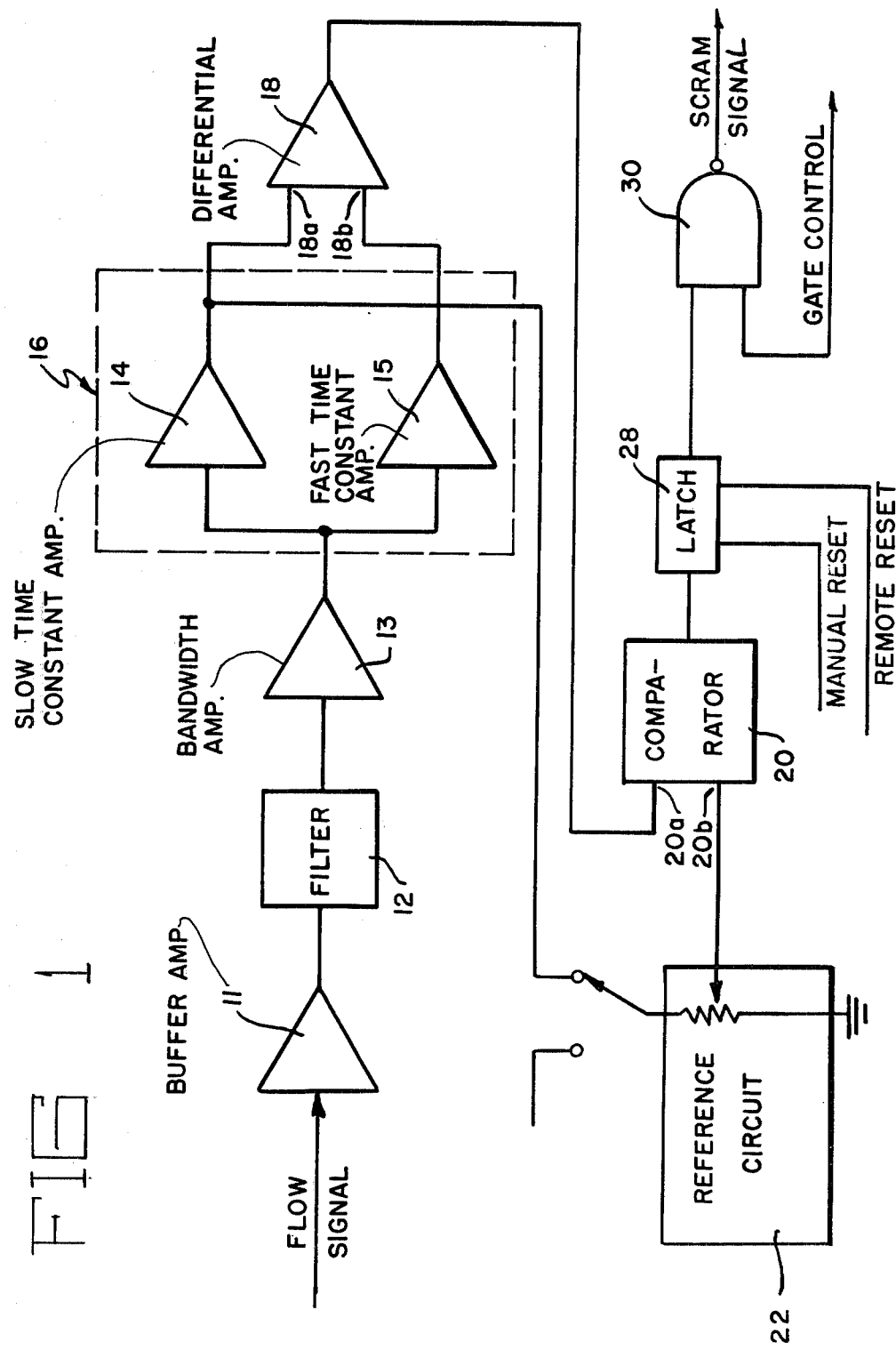
FIG. 1 is a block diagram of the alarm signal generator provided by the present invention.

Referring to the drawings, the alarm signal generating circuit shown in block diagram form in FIG. 1 is described with reference to an application in a nuclear reactor system for generating "scram" signal to initiate reactor shutdown in response to rapid variations in fuel motion-induced signals. The signals are generated by a flow detector (not shown), which monitors the flow rate of liquid sodium coolant which is circulated through the reactor. The fuel motion detection is based upon variation in liquid sodium coolant flow caused by nuclear fuel motion. The flow detector (not shown), which comprises a conventional electromagnetic flow meter, consists of an electromagnet the magnetic field of which passes through the coolant, perpendicular to the direction of flow. A pair of signal pickup wires are welded to the pipe containing the sodium at right angles to the magnetic field. The motion of the sodium passing through the magnetic field induces an EMF perpendicular to the field having a polarity dependent upon the magnetic field direction and flow direction, and having an amplitude dependent upon rate of flow of the sodium and field strength. The induced signal generated by the flow meter consists of a component proportional to sodium flow and a 60 Hz component due to the large stray 60 Hz currents flowing in the annular linear induction pump which circulates the sodium coolant through the reactor.

With reference to FIG. 1, the flow signal, which is typically less than 10 millivolts, is amplified in a wide band amplifier (not shown) which provides an output in the order of 2 volts. This signal output is applied through a buffer amplifier 11 to a 60 Hz notch filter 12 which provides 40 DB attenuation at 60 Hz of the noise component due to the pump which circulates the coolant. The filtered signal is applied to a bandwidth amplifier 13, having a 6 DB cutoff frequency of 2 KHz, which removes high frequency spurious noise signals as may be introduced by the input amplifier stages. Amplifier 13 also couples the signal to parallel connected amplifiers 14 and 15 which constitute a long-term drift effect elimination circuit 16. One of the amplifiers 14 has a slow time constant adjustable from 0.01 to 1.0 seconds, for example. The other amplifier 15 has a fast time constant adjustable from 0.0001 to 0.001 seconds, for example.

The outputs of the amplifiers 14 and 15 are coupled to respective inputs 18a and 18b of a differential amplifier 18. Steady-state and long-term drifts of the flow signal produce no output from the differential amplifier 18. However, fast changes of the flow signal pass amplifier 15, but not amplifier 14, resulting in an output from the differential amplifier 18. The signal output of the differential amplifier 18 is extended to one input 20a of a comparator circuit 20 which has its second input 20b connected to a reference circuit 22, which provides a reference signal at comparator circuit input 20b which establishes the turn on threshold for the alarm signal generating circuit. The reference circuit 22, as shown in FIG. 1, is represented by a potentiometer 25 having its resistance portion connected between the signal output of the slow time constant amplifier and ground, and having its wiper 25a connected to comparator circuit input 20b. The reference signal is proportional to the signal output of the slow time constant amplifier, and thus to the steady-state flow rate of the coolant. The potentiometer wiper 25a is preset, using a DC reference signal, connectable to the potentiometer by way of manually operable calibration switch 26, to provide a reference signal which represents a preselected percentage of the steady-state signal provided by the slow time constant amplifier.

For a fast flow variation which equals or exceeds the preselected percentage of the steady-state flow rate, the signal output of the differential amplitude 18 will equal or exceed the reference signal, causing the comparator circuit 20 to switch states, and generate a logic level shift at its output. This logic level output of the comparator circuit 20 controls a latch circuit 28 which in turn enables an output gating circuit 30 to generate an alarm output, or scram signal, which initiates reactor shutdown. A gate control signal supplied to a further input of the gate circuit enables the output of the alarm signal generating circuit to be gated off, as during initial startup of the reactor. The latch 28 is resettable either manually or by way of a signal Remote Reset provided by a controller (not shown) associated with the reactor.

Figure 2:
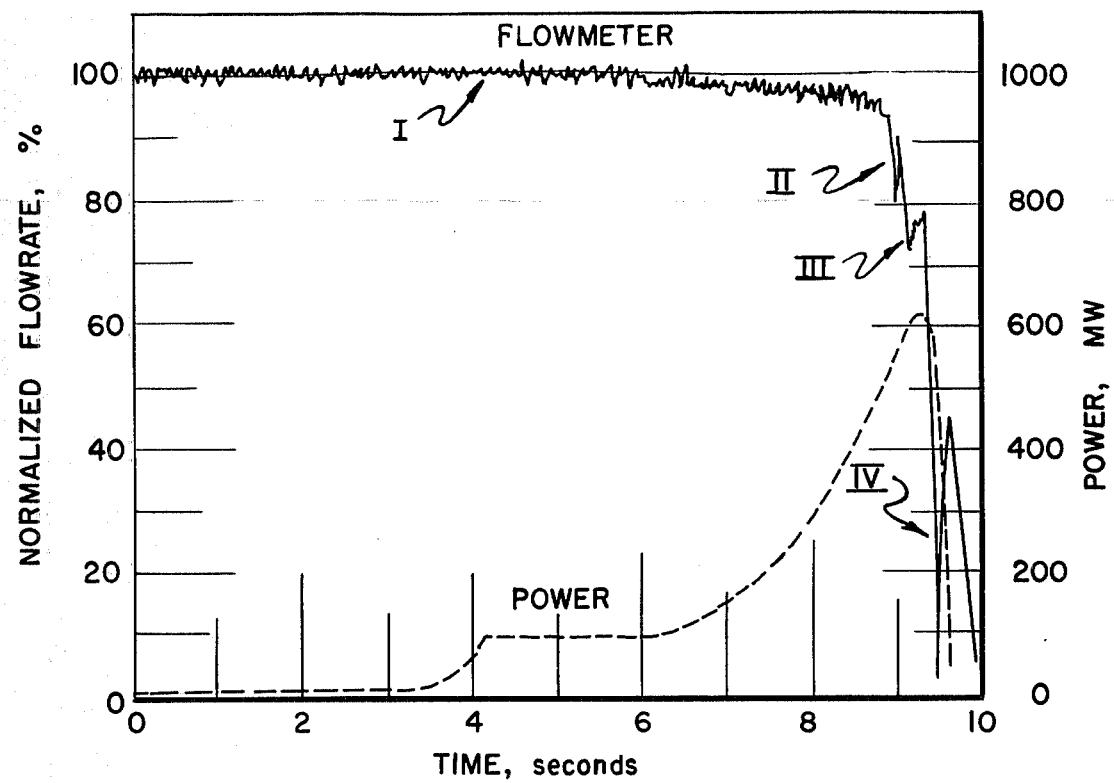
FIG. 2 is a graphical illustration of the flow meter output signal as a function of time and reactor power as a function of time.

Referring to FIG. 2, there is illustrated a representation of test data which may be obtained during the testing of a reactor. The test data graphically shows percent normalized flow rate and reactor power as a function of time. As the reactor proceeds to programmed high power, the flow meter output signal is seen to fluctuate slightly around 100% as indicated at reference character I. The illustrated characteristic shows two flow declines of approximately 20-24% occurring after approximately 9 seconds following start up, as indicated at points II and III, and a third decline, in the order of 40% from the steady state value, occurring at approximately 9.4 seconds as indicated at point IV.

Figure 3:
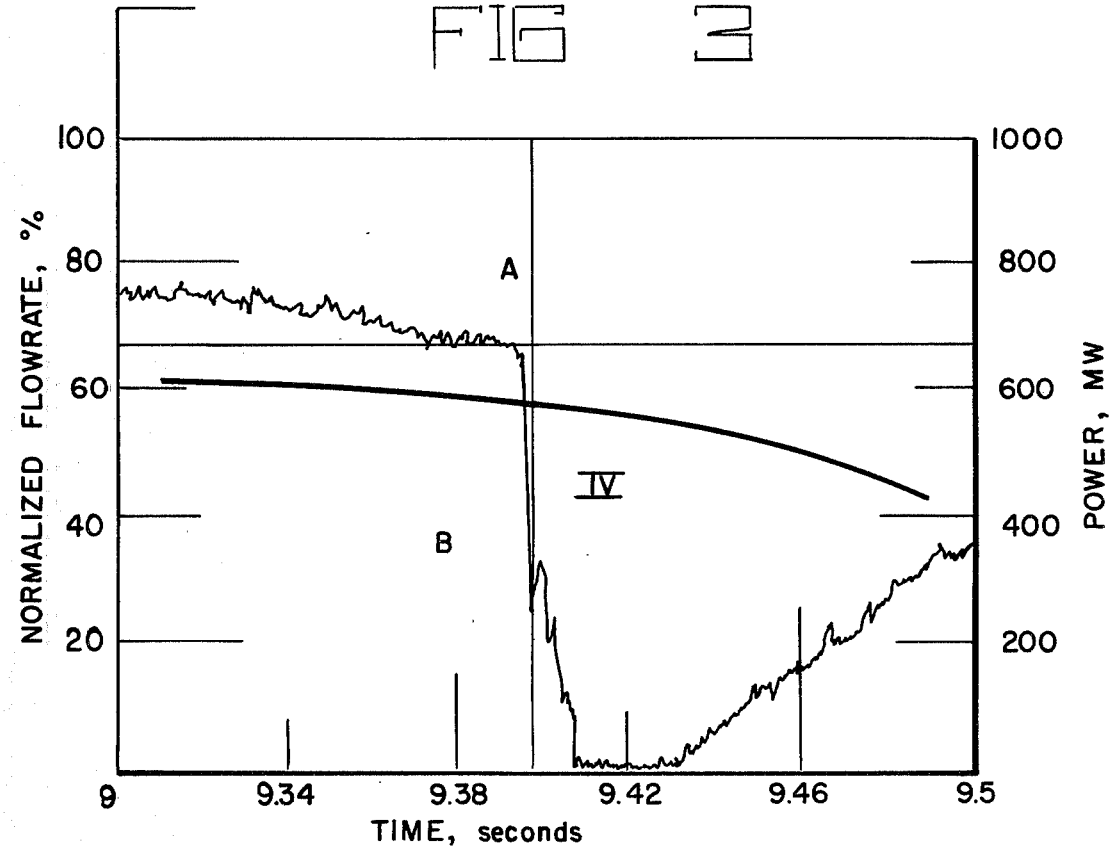
FIG. 3 is a showing of an expanded portion of the graph shown in FIG. 2.

Referring to FIG. 3, which is expanded view of the portion of the graph of FIG. 2 at the time of occurrence of 40% flow rate decline, just prior to the rapid decline, the steady state flow rate is approximately 67.5 percent as indicated at point A. The flow rate declines rapidly to a value of 40 percent, as indicated at point B, which represents a decrease of approximately 40% from the steady rate value of 67.5 percent at the time of occurrence of the rapid decline.

For purposes of illustration of the operation of the alarm signal generating circuit, the reactor power and normalized flow rate are assumed to be as illustrated in FIG. 2, and the potentiometer 25 of the reference circuit 22 is preset to permit an alarm output to be generated only for a rapid-flow decline of 40% or more from the steady state flow level at the time of the rapid-flow decline.

With reference to FIGS. 1 and 2, as long as the flow meter signal remains substantially constant, as during the first eight seconds following startup, the signal outputs of the amplifiers 14 and 15 of the long-term drift compensation circuit 16 are comparable, and there is no change in the signal output of the differential amplifier 18. When the first rapid decline, point II, occurs, the signal output of the fast time constant amplifier immediately reflects the rapid change in the flow signal. However, since the signal output of the slow time constant amplifier does not change as rapidly, initially, there is a difference in amplitude of the signal inputs to the differential amplifier 18 which provides an output representing this difference. Since the decrease is less than 40%, the differential amplifier output signal does not exceed the reference level established by the reference circuit 22 and the comparator circuit 20 does not switch state. Similarly, the rapid change indicated at point III does not cause the comparator circuit to switch.

Referring to FIG. 3, for the rapid decline of the flow signal indicated at point IV, which exceeds 40% of the steady state value of the flow signal at the time of the rapid decline, the difference in the signal outputs of the amplifiers 14 and 15 cause the differential amplifier to provide a signal output which exceeds the reference level causing the comparator circuit 20 to switch states, generating a logic level which sets the latch 28. When latch 28 is set, gate circuit 30 is enabled, generating a scram signal to initiate reactor shut down.

DETAILED DESCRIPTION

Figure 4:
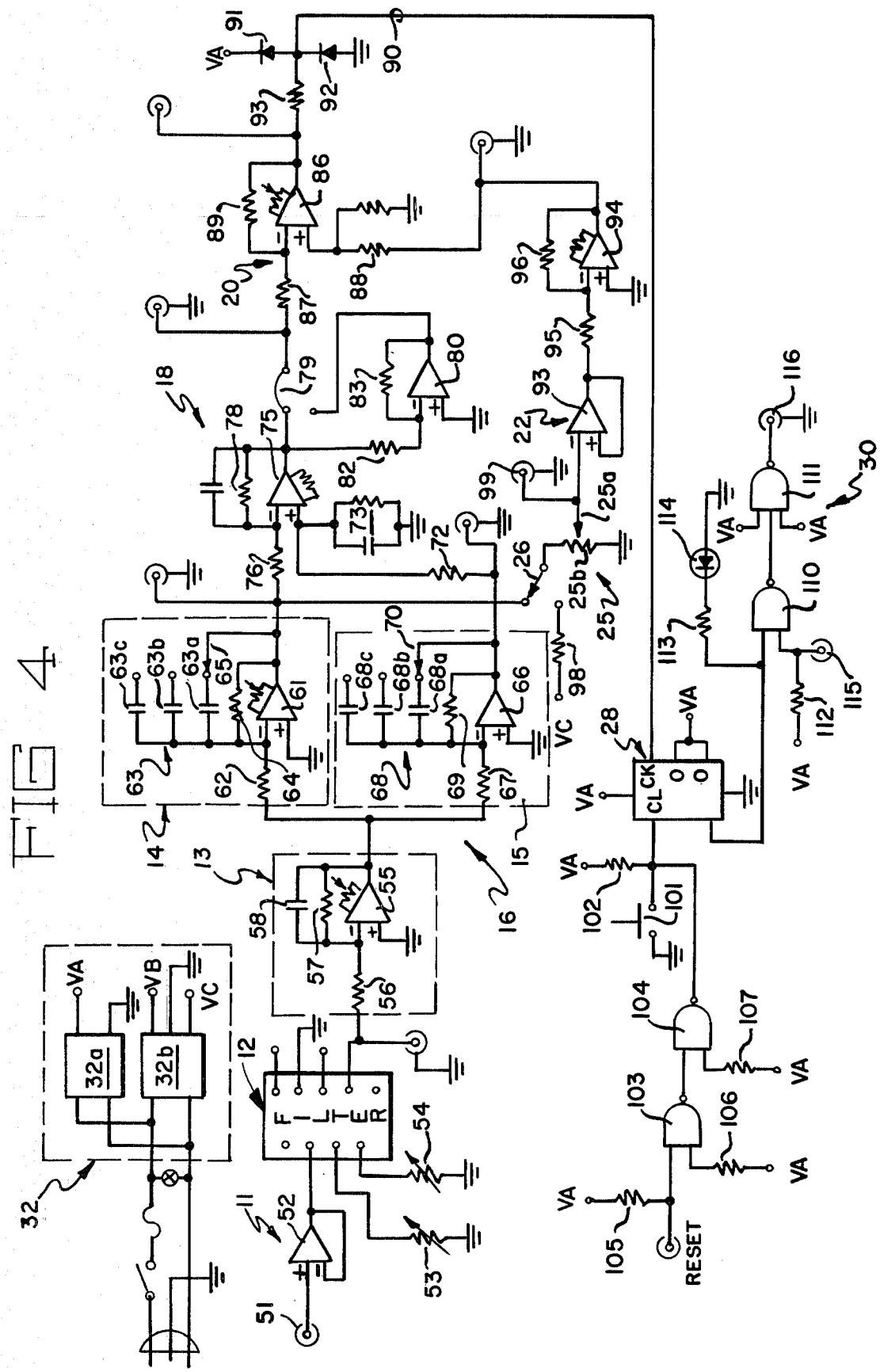
FIG. 4 is a schematic circuit diagram of the alarm signal generator shown in FIG. 1.

Referring to FIG. 4, which is a schematic circuit diagram of the alarm signal generating circuit shown in FIG. 1, a power supply circuit 32 includes a pair of voltage regulator circuits 32a and 32b connectable to a 120 VAC source for providing DC power signals VA, VB and VC at levels +5 vdc, +15 vdc and −15 vdc for the alarm generating circuit.

The flow meter signal is supplied to the alarm signal generator over an input terminal 51 which is connected to an input of operational amplifier 52, connected as a voltage follower, which comprises the buffer amplifier stage 11. The output of the amplifier 52 is connected to an input of the 60 Hz filter 12, which may be the type ATF 76-MP-060 filter circuit, which attenuates the 60 Hz noise component of the flow signal due to the sodium pump. The filter circuit has a Q of 10 and provides 40 DB of attenuation at 60 Hz. The notch depth is preset by way of variable resistor 53 and the center frequency is preset by way of variable resistor 54.

The bandwidth amplifier 13 comprises an operational amplifier 55 connected for operation as an active filter circuit for filtering high frequency noise from the flow signal. Input resistor 56 and feedback elements including resistor 57 and capacitor 58 are selected to establish a 2 KHz pass band for the bandwidth amplifier 13.

Referring to the long-term drift compensation circuit 16, which processes the flow signal and discriminates between long term and short term variations in the flow signal, the slow time constant amplifier 14 comprises an operational amplifier 61 having an associated timing network formed by input resistor 62 and a set of capacitors 63. The value of input resistor 62 is 1 Megohm and the value of capacitors 63a, 63b and 63c are 1, 0.1 and 0.01 uFds, respectively. The capacitors 63a–63c are individually selectable by way of a select switch 65, shown selecting capacitor 63a, to provide different time constants, such as, 1 second, 0.1 second, and 0.01 seconds for the amplifier circuit 14. Similarly, the fast time constant amplifier 15 includes an operational amplifier 66 having an associated timing network including a 1 Megohm input resistor 67, and a set of capacitors 68 including capacitors 68a, 68b and 68c of respective values 0.01, 0.005 and 0.001 uFds. The amplifier 15 has time constants, such as 0.001, 0.0005 and 0.0001 seconds, as a function of the setting of the selector switch 70, shown selecting capacitor 68a. Feedback resistors 64 and 69, each 1 Megohm, stablize the operating point and prevent saturation of respective amplifiers 61 and 66.

The amplifier circuits 14 and 15 integrate the flow signal commonly supplied to inputs of both amplifiers. For steady-state and long-term slow drifts of the input flow signal, the signal outputs of the two amplifier circuits are comparable. For a rapid variation in the flow signal, such as the 40% decrease in the flow signal indicated at point IV in FIG. 3, which occurs within a time period of approximately 2.5 milliseconds, the 1 millisecond response time of the fast time constant amplifier enables it to respond to such variation and provide an output indicating the fast change. However, due to the 100 millisecond response time of the slow time constant amplifier, its output will not change fast enough to prevent switching of the comparator circuit 20.

The differential amplifier 18 comprises an operational amplifier 75 which has its inverting and non-inverting inputs connected over respective input resistors 76 and 72 to the outputs of the slow time constant amplifier 14 and the fast time constant amplifier 15. An RC network 73 is connected between the noninverting input of the amplifier 75 and ground, and an RC feedback network 78 is connected between the output and the inverting input of the amplifier 75. The signal output of the differential amplifier 18, which represents the difference between the signal outputs of the slow and fast time constant amplifiers, is connected by way of a link 79 to an input of the comparator 20. As illustrated, the alarm signal generating circuit responds to a rapid decline in the flow meter signal to generate an alarm output. Alternatively, the output of the differential amplifier 18 may be extended to the input of the comparator circuit 20 over an inverting circuit, comprised of operational amplifier 80 and associated resistors 82 and 83 which establish unity gain for the amplifier 80 to permit the alarm signal generating circuit to respond to rapid increases in the flow signal.

The comparator circuit 20 comprises an operational amplifier 86 which has its inverting input connected over resistor 87 and link 79 to the output of the differential amplifier to receive the processed flow signal. The noninverting input of the amplifier 86 is connected through input resistor 88 to the output of the reference circuit 22 to receive the reference signal which establishes the turn-on threshold for the alarm signal generating circuit. A feedback resistor 89 supplies DC feedback to the inverting input of the amplifier to maintain the amplifier output low as long as the reference signal is greater than the flow supplied to the comparator circuit 20. The signal output of the amplifier 86 is extended to the clock input of the latch circuit 28 by way of conductor 90 which is normally maintained at a potential VA/2 by a reference network comprised of diodes 91 and 92 and a resistor 93.

Referring to the reference circuit 22, select switch 26 normally connects one end of the resistance portion 25b of potentiometer 25 to the output of the slow-time constant amplifier at point 77, the other end of the potentiometer resistance being connected to ground. The wiper 25a of the potentiometer is connected to an input of an operational amplifier 93 connected for operation as an inverting buffer amplifier. The output of amplifier 93 is connected over a resistor 95 to the inverting input of an operational amplifier 94 which has its noninverting input connected to ground. Input resistor 95 and feedback resistor 96 provide unity gain for the amplifier 94, the output of which is connected through resistor 88 to the non-inverting input of amplifier 86 of the comparator circuit 20.

The reference level is set to provide a reference signal of an amplitude representing a preselected percentage of the steady state value of the flow signal output of the slow-time constant amplifier 14. Switch 26 is manually operable to connect the ungrounded end of the resistance portion of the potentiometer 25 to a reference source provided by a resistor 98 which is connected to source voltage VC at −15 vdc (since the signal output of slow time constant amplifier 61 is negative). A test point 99, which is connected to wiper 25a of the potentiometer, enables monitoring of the voltage at the wiper as the wiper is adjusted to provide the voltage level corresponding to the selected percentage of the steady state signal output desired.

The latch circuit 28, is a type 7474 dual latch having its data inputs connected to voltage VA, and its clock input connected through conductor 90 to the output of the comparator circuit 20.

The positive level VA is clocked into the latch whenever a negative going signal is applied to its clock input, causing its output to go high and remain high until the latch is cleared. The latch circuit is normally maintained in its clear state, either through operation of a manual clear switch 101, or remotely by way of a reset circuit 102 comprised of NAND gates 103 and 104 which respond to a negative going reset signal provided by a controller (not shown) associated with the reactor, and provide a negative going clear signal for the latch circuit 28. The latch circuit is set whenever the comparator circuit 20 switches state in response to a fast variation in the flow signal, applying a negative going signal to the clock input of the latch circuit.

The signal output of the latch circuit controls the state of the output gate circuit 30 which is comprised of NAND gates 110 and 111. Gate 110 serves to gate the output of the latch circuit 18 to gate 111 which generates the scram output signal at terminal 116. Gate 110 is normally primed by an enabling signal supplied to one of its inputs via a resistor 112 to follow the output of the latch circuit 28 and enable gate 111 whenever the latch circuit output is low. The scram gate control signal, which is applied via input terminal 115 to the input of gate 110, inhibits the gate and prevents it from following the latch circuit 28. A status indicator, shown as a light emitting diode 114, is connected to the output of the latch circuit 28 and is lit whenever the latch circuit 28 is set.

Having thus disclosed in detail preferred embodiments of the invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

We claim:

1. An alarm signal generating circuit for monitoring a low-level electrical signal characterized by long-term drift in real time and for providing an alarm output in response to a given change in the signal, said circuit comprising:
   input means for receiving the signal;
   discriminating means including first circuit means responsive to the received signal for providing a first output signal indicating the steady-state value of the received signal during a given time interval, and second circuit means responsive to the received signal for providing a second output signal indicating the value of the received signal during subintervals of said given time interval;
   differential detecting means for providing a difference signal of an amplitude corresponding to the difference between said first and second output signals;
   reference means for providing a reference signal related in amplitude to the steady-state value of the received signal during said time interval;
   and comparator circuit means for comparing said difference signal with said reference signal and for providing said alarm output whenever the amplitude of said difference signal is at least equal to the amplitude of said reference signal, indicating a given change in the received signal relative to its steady state value during said time interval.

2. A circuit as set forth in claim 1 wherein said reference means is coupled to an output of said first circuit means to derive said reference signal from said first signal provided by said first circuit means.

3. A circuit as set forth in claim 2 wherein said reference means provides a signal having an amplitude that is proportional to the amplitude of the first signal provided by said first circuit means and represents a preselected percentage of the steady-state value of said received signal, said comparator circuit means being effective to provide an alarm output whenever said second signal varies relative to the steady state value of said received signal by an amount corresponding to said preselected percentage.

4. A circuit as set forth in claim 3 wherein said reference means includes means adjustable to vary the amplitude of the reference signal to correspond to a preselected percentage of the steady-state value of the received signal.

5. A circuit as set forth in claim 1 wherein said first and second circuit means comprise respective first and second amplifier circuits, each having an associated timing network for determining the durations of said time interval and said subintervals, respectively.

6. A circuit as set forth in claim 1 wherein said input means comprises filter circuit means which passes only signals within a preselected pass band.

7. A circuit as set forth in claim 1 wherein said electrical signal is a flow signal representing the direction and rate of flow of a fluid and wherein said comparator circuit means is enabled to provide its alarm output in response to a predetermined variation in the flow rate of the fluid.

8. An alarm signal generating circuit for monitoring the signal output of a flowmeter, which provides a flow signal representing the direction and rate of flow of a fluid, and for providing an alarm output in response to a change in the flow signal indicating a fast-flow variation in the flow rate of the fluid, said circuit comprising:
   input means for receiving the flow signal;
   discriminating means including first signal processing means responsive to said flow signal for generating a first signal representing the steady-state value of the flow signal during a given time interval; and second signal processing means responsive to said flow signal for generating a second signal which varies in accordance with short-term variations of the flow signal during said time interval;
   reference means for generating a reference signal which is proportional to the steady-state value of the flow signal;
   and output means responsive to said first and second signals and to said reference signal for generating said alarm output in response to a difference between said first and second signals that is indicative of a short-term variation in the flow rate which exceeds a preselected percentage of the steady state value of the flow signal.

9. A circuit as set forth in claim 8 wherein the flowmeter monitors the flow rate of liquid coolant in a nuclear reactor installation and wherein said output means is enabled to generate its alarm output to initiate shut down of the reactor in response to a predetermined decrease in the coolant flow rate, relative to its steady value.

10. An alarm signal generating circuit for monitoring the signal output of a flow meter, which provides a flow signal representing the direction and rate of flow of a fluid, and for providing an alarm output in response to a change in the flow signal indicating a fast-flow variation in the flow rate of the fluid, said circuit comprising:
   input means for receiving the flow signal;
   discriminating means including first signal processing means responsive to said flow signal for providing a first output signal related to the steady state flow rate of the fluid during a given time interval; second signal processing means responsive to said flow signal for providing a second output signal representing the flow rate of the fluid during subintervals of said time interval;
   differential detecting circuit means for providing a difference signal indicating the difference between said output signals and thus a change in flow rate of the fluid relative to its steady state value;

reference means for providing a reference signal proportional to the steady state flow rate of the fluid; and comparator circuit means for comparing said difference signal with said reference signal and for providing said alarm output whenever said difference signal is at least equal to said reference signal.

11. A circuit as set forth in claim 10 wherein said reference means includes circuit means for deriving said reference signal from said first output signal provided by said first signal processing means.

12. A circuit as set forth in claim 10 wherein the reference signal provided by said reference means represents a preselected percentage of the steady state value of the flow signal, said comparator circuit means being operable to provide said alarm output whenever the flow signal varies from its steady state value by an amount corresponding to said preselected percentage.

13. A circuit as set forth in claim 12 wherein said reference means includes means adjustable to preselect the percentage of the steady state value of the flow signal supplied to said comparator circuit means.

14. A circuit as set forth in claim 10 wherein said first and second signal processing means comprise first and second amplifier circuits each having an associated timing network for determining the durations of said time interval and said subintervals, respectively.

15. A circuit as set forth in claim 10 wherein the flowmeter monitors the flow rate of liquid coolant in a nuclear reactor installation and wherein said comparator circuit means is enabled to generate its alarm output to initiate shut down of the reactor in response to a predetermined decrease in the coolant flow rate, relative to its steady value, during one of said subintervals of said time interval.

* * * * *